UNITED STATES PATENT OFFICE.

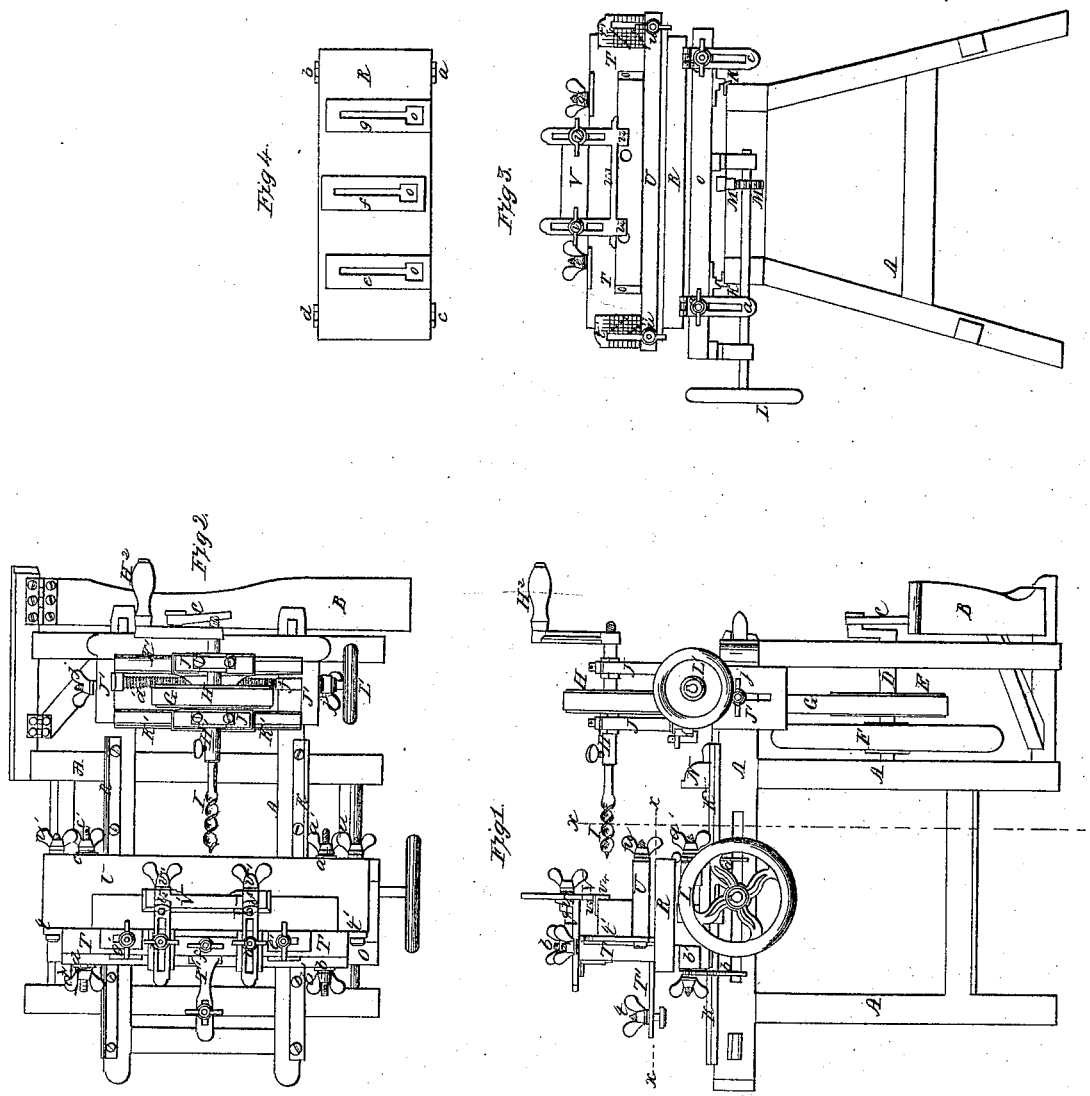
J. Jones,
Boring Wood,
Nº 5,809.    Patented Sep. 26, 1848.

JOSEPH JONES, OF CAMDEN, NEW JERSEY.

BORING-MACHINE.

Specification of Letters Patent No. 5,809, dated September 26, 1848.

*To all whom it may concern:*

Be it known that I, JOSEPH JONES, of the city and county of Camden and State of New Jersey, have invented certain new and useful Improvements in Machines for Boring Holes in Wood and other Substances, of which the following is a full, clear, and exact description, reference being had to the accompanying drawings of the same, making a part of this specification, of which—

Figure 1 is a side elevation, showing the various parts of the machine in connection. Fig. 2 is a top, or birdseye view. Fig. 3 is a vertical transverse section through the line $x$ $x$ of Fig. 1. Fig. 4 is a horizontal section through the line $x$ $x$ Fig. 1, of the holder or rest, showing a top view of the platform.

When the same parts occur in the different figures they are designated by the same letters of reference.

The nature of my invention and improvement, consists in combining with the boring machine constructed in the usual or in any convenient and suitable manner, a graduated adjustive compound rest or holder mounted upon a carriage which moves on ways toward or from the auger or boring bit, upon which rest, the wood or other substances to be bored is secured by a compound adjustive clamp so arranged as to seize and hold securely a piece of any regular or irregular form, such as would ordinarily be required to be bored. The universal adjustability of the rest rendering it easy to present substances to the auger in such position that holes are bored into them in any required direction.

My invention further consists in providing an additional adjustive graduated rest or centers, on which hubs for carriage wheels and cylindrical or other formed substances which require a series of equidistant, or alternately equidistant radial holes bored around their periphery are held, and on which they are turned in changing the auger from one hole to the point where the next is to be bored. The whole forming a compact, simple and commodious machine, by which boring in general may be performed with greater celerity and accuracy than can be done by any machine heretofore used for such purposes.

To enable others skilled in the art to make and use my invention I will proceed to describe its construction and operation.

The frame A, the treadle B, the connecting rod C, crank shaft D, pulley E, fly wheel F, endless belt G, pulley H, mandrel H', hand crank or winch H², auger or bit I, heads or standards and carriage J, on which the mandrel is mounted, the longitudinal ways K, the transverse ways K', the adjustive stocks J', on which the ways K' are secured, the adjusting screw J² which slides and adjusts the carriage J with the auger in any given position on the ways K', the hand wheels L and L', pinion M, rack M', stop N, and carriage O, are all constructed and arranged in the usual, or in any convenient manner, and therefore do not require a particular description.

To the carriage O which slides on the ways K, the platform R is secured, by the hinged graduated legs or standards *a b c d*, which are held against its sides by the clamp screws *a' b' c' d'*, which screws pass through longitudinal slits or mortises made through the legs. On the edges of these legs or standards, uniform scales of equal parts are graduated for the purpose of determining with accuracy the position of the surface of the platform relative to the upper surface of the carriage, which latter is always horizontal. Upon the upper surface of the platform the slit guide and clamp plates *e f g* are secured by screws or otherwise; said plates being let into the wood so that their upper sides are even with the surface of the platform. The slits in these plates are of such width that the shanks of the clamp screws *e' f' g'* will slide freely therein, while the heads of said screws slide beneath the plates. The heads of the bolts are introduced beneath the plates through openings *o o o* made through the plate for that purpose at the front end of the slits. The wood beneath the plates is removed where it would obstruct the sliding of the bolts.

The back or vertical part of the rest T is of an oblong rectangular form, and is placed upon the platform on its edge, through its center a vertical cylindrical hole, and near its ends two vertical oblong holes, are made. Through these holes the clamp screws *e', f', g',* connected by their heads with the clamp plates are passed, by means of which the back T of the rest is secured upon the platform R, in any longitudinal position in which it may be required to place it.

From the lower edge of the back of the rest a horizontal arm T' projects having a clamp screw t moving in a slit in its outer end. When the rest is placed transversely across the platform, it is secured in its position by the clamp screw f', placed in the clamp plate f, and the clamp screw t placed in the clamp plate e, or g, as the arm T' may be placed over the one or the other of these plates.

On either end of the front side of the back T, a metallic plate t is secured, in which a vertical slit is made on the face of these plates scales of equal parts are graduated for the purpose of determining more readily the position of the horizontal part V of the rest, relative to the platform R. On the front side of the back a vertical recess is made for the purpose of allowing the point of the auger or bit to protrude through the substance through which a hole is being made.

Upon the front side of the back T the horizontal part of the rest or upper platform U is secured by the clamp screws $u$ $u'$, which are connected with the plates $t$ $t'$ of the back, and pass through horizontal holes made in the platform near its ends. This platform upon which the piece to be bored is placed, can be raised or lowered at either end by loosening the clamp screws and sliding them up or down in the vertical slits in the plates $t'$ and when placed in the required position can be secured thereby again tightening the clamp screws $u$ $u'$. By this means the upper platform U may be placed at any required degree of longitudinal inclination (within the limits of its adjustability) to the lower platform R.

When a piece of wood or other substance is placed upon the rest to be bored it is held in its proper position by the compound adjustive clamp V, V', which is secured to the upper edge of the back T by screws $v$ $v$. This clamp is composed of two parts secured together by the clamp screws $v'$ $v'$; these parts in form somewhat resemble rectangular staples, having flat legs with slits in them for the purpose of sliding on the shanks of the clamp screws, these legs being connected by a broad and flat transverse piece projecting at right angles from the side of the legs. On the inside of the transverse piece of the part V of the clamp, the bosses $v^2$ $v^2$ are formed, in which female screws are made to secure the clamp screws $v'$ $v'$. The transverse piece $v^3$ of the front or vertical part of the clamp V', is for the purpose of resting on the top of the front edge of any piece that may be placed upon the rest to be bored; while the projecting ends $v^4$ $v^4$ of the legs will rest against the front side of the same.

The two parts of the clamp admit of being raised, lowered, and otherwise altered in their position, so as to seize and hold firmly upon the rest, a piece of almost any form.

The operation of the machine is as follows: For the purpose of boring a series of horizontal holes in a right line in a piece of wood, the platform R is adjusted so that the same division mark on the scales of all the hinged legs $a$, $b$, $c$, $d$, corresponds with the upper surface of the carriage, in which position it is secured by the clamp screws $a'$ $b'$ $c'$ $d'$. In this position the platform is parallel to the carriage. The back T, is next placed in a position parallel to the sides of the platform, where it is secured by the clamp screws $e'$, $f'$, $g'$. The substance to be bored is now placed upon the rest U which is raised or lowered as may be required to bring the piece to the proper elevation, and then fastened by the clamp screws $u$ $u'$, the piece of wood is now secured upon the rest by the clamp V, V', by lowering the part V' until the transverse piece $v^3$ rests upon the upper edge of the piece; the part V is now drawn back until the projecting ends $v^4$ $v^4$ rest against the upper edge of the front of the piece; the part V is now clamped firmly to the back T by the screws $v$, $v$, and the part V' is clamped to the part V, by the screws $v'$ $v'$. By this means the piece to be bored is held firmly down to the platform U and against the back T. The operator now lays hold with his left hand of the hand wheel L and turns it, which turns the pinion on the rack and advances the carriage with the rest and the piece of wood to the auger, against which the wood is pressed with any degree of force the operator chooses to exert through the hand wheel. Next, with his right hand the operator lays hold of the winch and turning it, turns the mandrel, auger, and fly wheel which are all connected together, and the auger enters the wood into which it continues to penetrate until arrested by the carriage coming into contact with the stop N, which governs the depth of the hole. After one hole of a series is bored the carriage is run back by reversing the motion of the hand wheel L, far enough to withdraw the wood from the auger, the auger is then moved horizontally across the frame on the ways K' by the set screw $J^2$ which is turned by means of the hand wheel L', until it is in the proper position to bore a second hole. The former operation is now repeated and the second hole is bored. In this way any required number of holes are made.

To bore holes in an oblique direction into any substance the operation is the same as has been described for boring holes at right angles, in all other respects than in the adjustment of the rest and platform, because the position of the auger being at all times parallel to the top and at right angles to the sides of the carriage, the greater or less obliquity of holes that may be made is produced by the greater or less obliquity with which the wood is presented to the bit. To adjust the platform in an oblique position, its front edge and the end next the hand wheel being highest; loosen the clamp screws $a'$ $b'$ and raise the end to the required height, then tighten the screw $b'$; next loosen the screw $c'$ and raise the front side as high as required, then tighten the screws $a'$ $c'$, the platform is now placed at the required degree of obliquity. In case the slits in the hinged legs $a$ $b$ are not long enough to admit of the ends of the platform being raised sufficiently to produce in the rest the required degree of obliquity; the rest is itself adjusted by raising one end of the platform U sufficient to compensate for the deficiency. The degree of the obliquity of the upper platform U with reference to the platform R is accurately determined by the scales on the plates $t'$, and when placed in any given position on the back T this platform is held by the screws $u$ $u'$. The adjustment of the two platforms determines the vertical obliquity of the holes; but if horizontal obliquity in the direction of the holes, is also required, it must be produced by adjusting the back T at the required angle across the platform R, where it will be secured in any required position by the clamp screws $e'$ $f'$ $g'$. If it is required to bore into the end of a piece of timber it is secured upon the rest which with the back is turned upon the center clamp screw $f'$, (the clamp screw $e'$ and $g'$ being removed) by which and the clamp screw $t$, the latter being placed in the slit guide plate $e$ or $g$, the rest is secured in any required position. The piece to be bored being secured to the rest, it is made to assume any position with regard to the auger that the rest assumes, consequently the position of the rest determines the direction of the hole.

Although in constructing my improved boring machine I had chiefly a view to its application to the purpose of carriage building, yet it may be applied to various other purposes where boring is required, and may in some cases be substituted for other machinery now in use for the same purpose, with great advantage.

What I claim as my invention and desire to secure by Letters Patent is—

1. The combination of the adjusting platform (R) having hinged, graduated, sliding legs $a$, $b$, $c$, $d$ which with the carriage (O), for the purpose of supporting the several rests in various positions, as herein set forth.

2. The combination herein described, of the adjustive platform (R) and carriage (O), with the compound adjustive rest (T, U), for the purpose of holding any substance to be bored and advancing the same upon the auger, in such position, that holes will be made in it in any required direction.

3. The combination of the compound adjustive clamp (V, V'), with the adjustive rest (T U), as herein described; for the purpose of clamping and holding firmly any substance which it may be required to bore, whether the same be of regular or irregular form.

In testimony whereof I have hereunto signed my name in presence of two subscribing witnesses this twenty-first day of October A. D. 1847.

JOSEPH JONES.

Witnesses:
 ALBERT G. BARTLETT,
 PETER H. WATSON.